United States Patent
Sun

(10) Patent No.: US 10,661,715 B2
(45) Date of Patent: May 26, 2020

(54) REARVIEW SYSTEM AND VEHICLE HAVING THE SAME

(71) Applicants: BOE TECHNOLOGY GROUP CO., LTD., Beijing (CN); BEIJING BOE CHATANI ELECTRONICS CO., LTD., Beijing (CN)

(72) Inventor: Yi Sun, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 260 days.

(21) Appl. No.: 15/503,651

(22) PCT Filed: Jun. 29, 2016

(86) PCT No.: PCT/CN2016/087585
§ 371 (c)(1),
(2) Date: Feb. 13, 2017

(87) PCT Pub. No.: WO2017/148055
PCT Pub. Date: Sep. 8, 2017

(65) Prior Publication Data
US 2018/0118113 A1    May 3, 2018

(30) Foreign Application Priority Data
Mar. 4, 2016    (CN) .......................... 2016 1 0125643

(51) Int. Cl.
*B60R 1/08*    (2006.01)
*B60R 1/00*    (2006.01)
(Continued)

(52) U.S. Cl.
CPC .................. *B60R 1/08* (2013.01); *B60R 1/00* (2013.01); *G02F 1/133536* (2013.01);
(Continued)

(58) Field of Classification Search
CPC ........ B60R 1/08; B60R 1/00; G02F 1/133536
See application file for complete search history.

(56) References Cited

U.S. PATENT DOCUMENTS 6,256,067 B1 *  7/2001  Yamada ............... H04N 5/2354
                                                         348/229.1
6,328,447 B1 * 12/2001  Yamazaki ............. G02B 5/201
                                                              353/31
(Continued)

FOREIGN PATENT DOCUMENTS

CN    101190672 A    6/2008
CN    101447152 A    6/2009
(Continued)

OTHER PUBLICATIONS

First Chinese Office Action, for Chinese Patent Application No. 201610125643.8, dated Jun. 19, 2017, 11 pages.
(Continued)

*Primary Examiner* — Lucy P Chien
(74) *Attorney, Agent, or Firm* — Kinney & Lange, P.A.

(57) ABSTRACT

A rearview system for a vehicle and a vehicle having the rearview system are disclosed. The rearview system includes: an image pick-up device configured to acquire an image showing a condition beside and behind the vehicle; and a liquid crystal display device configured to display the image acquired by the image pick-up device in real time. The liquid crystal display device comprises a backlight module, a liquid crystal display panel, a semi-transmissive and semi-reflective functional layer arranged between the backlight module and the liquid crystal display panel. The semi-transmissive and semi-reflective functional layer is configured to transmit light emitted by the backlight module when the backlight module is turned on and to reflect external ambient light when the backlight module is turned off.

20 Claims, 3 Drawing Sheets

(51) Int. Cl.
*G02F 1/1335* (2006.01)
*G02F 1/13357* (2006.01)
*H04N 5/232* (2006.01)
*H04N 5/33* (2006.01)

(52) U.S. Cl.
CPC .. *G02F 1/133555* (2013.01); *G02F 1/133603* (2013.01); *G02F 1/133605* (2013.01); *G02F 1/133606* (2013.01); *H04N 5/23238* (2013.01); *H04N 5/33* (2013.01); *B60R 2300/802* (2013.01); *B60R 2300/8046* (2013.01); *G02F 2001/133557* (2013.01); *G02F 2001/133567* (2013.01); *G02F 2001/133607* (2013.01); *G02F 2001/133626* (2013.01)

(56) References Cited

U.S. PATENT DOCUMENTS

| | | | | |
|---|---|---|---|---|
| 6,975,455 | B1* | 12/2005 | Kotchick | G02B 5/305 |
| | | | | 359/485.03 |
| 8,767,145 | B1* | 7/2014 | Zhang | G02F 1/13471 |
| | | | | 349/114 |
| 2004/0061812 | A1* | 4/2004 | Maeda | G02F 1/133615 |
| | | | | 349/65 |
| 2005/0206806 | A1* | 9/2005 | Yu | G02B 6/0053 |
| | | | | 349/64 |
| 2006/0138437 | A1* | 6/2006 | Huang | G02B 3/04 |
| | | | | 257/98 |
| 2010/0127825 | A1 | 5/2010 | Drummond et al. | |
| 2010/0165660 | A1* | 7/2010 | Weber | G02B 5/305 |
| | | | | 362/609 |
| 2014/0119055 | A1* | 5/2014 | Zhang | G02B 6/0085 |
| | | | | 362/621 |
| 2015/0009451 | A1* | 1/2015 | Zhu | G02F 1/13363 |
| | | | | 349/64 |

FOREIGN PATENT DOCUMENTS

| | | |
|---|---|---|
| CN | 101522470 A | 9/2009 |
| CN | 101844544 A | 9/2010 |
| CN | 104271401 A | 1/2015 |
| CN | 104742807 A | 7/2015 |
| CN | 105644443 A | 6/2016 |
| CN | 205344698 U | 6/2016 |
| EP | 2419787 A1 | 2/2012 |
| WO | 2015146119 A1 | 10/2015 |

OTHER PUBLICATIONS

Second Chinese Office Action, for Chinese Patent Application No. 201610125643.8, dated Jan. 16, 2018, 16 pages.
International Search Report and Written Opinion from PCT Application Serial No. PCT/CN2016/087585, dated Oct. 20, 2016, 11 pages.

* cited by examiner

REARVIEW SYSTEM AND VEHICLE HAVING THE SAME

CROSS REFERENCE TO RELATED APPLICATIONS

This application is a Section 371 National Stage Application of International Application No. PCT/CN2016/087585, filed on 29 Jun. 2016, entitled "REARVIEW SYSTEM FOR VEHICLE AND VEHICLE", which claims priority to Chinese Application No. 201610125643.8, filed on 4 Mar. 2016, incorporated herein by reference in its entirety.

TECHNICAL FIELD

The present application relates to the field of display technologies, and specially, to a rearview system and a vehicle having the rearview system.

BACKGROUND

In order to allow a driver to quickly and effectively observe a condition beside and behind a vehicle during driving and to ensure safety, the vehicle is equipped with a rearview mirror, so as to facilitate backing the vehicle and to prevent collision with a following vehicle. Currently, existing rearview mirrors for vehicles have a blind area of viewing field, especially, when a vehicle is turning, its blind area becomes larger, which bring significant risk for driving safety.

SUMMARY

The present invention has been made to overcome or alleviate at least one aspect of the above mentioned disadvantages.

According to an aspect of the present invention, there is provided a rearview system for a vehicle.

In an exemplary embodiment, the rearview system may include: an image pick-up device configured to acquire an image showing a condition beside and behind the vehicle; and a liquid crystal display device configured to display the image acquired by the image pick-up device in real time. The liquid crystal display device may include a backlight module, a liquid crystal display panel, a semi-transmissive and semi-reflective functional layer arranged between the backlight module and the liquid crystal display panel. The semi-transmissive and semi-reflective functional layer is configured to transmit light emitted by the backlight module when the backlight module is turned on and to reflect external ambient light when the backlight module is turned off.

In a further embodiment, the rearview system may further include a switch configured to control at least one of the backlight module and the image pick-up device to be turned on or turned off.

In a further embodiment, the liquid crystal display device may further include a lower polarizer disposed on a side of the liquid crystal display panel adjacent to the backlight module and an upper polarizer disposed on a side of the liquid crystal display panel facing away from the backlight module; and the semi-transmissive and semi-reflective functional layer includes a multilayer reflective polarizer arranged between the backlight module and the lower polarizer.

In a further embodiment, the multilayer reflective polarizer may be adhered to the lower polarizer.

In a further embodiment, the liquid crystal display panel may be a wide-angle liquid crystal display panel.

In a further embodiment, the backlight module may be a direct type backlight module.

In a further embodiment, the direct type backlight module may include a reflective sheet, a light source disposed uniformly on the reflective sheet, a diffuser, and one or more optical films; and the light source is configured to emit light and diffuse the emitted light.

In a further embodiment, the light source may be a LED light provided with a concave lens.

In a further embodiment, the image pick-up device may be a night vision image pick-up device.

In a further embodiment, the night vision image pick-up device may include an infrared lighting unit and an image pick-up unit.

According to another aspect of the invention, there is provided a vehicle, which includes the rearview system according to any one of the above embodiments.

A rearview system for a vehicle and a vehicle are disclosed in embodiments of the invention. On one hand, with a corporation of the image pick-up device and the liquid crystal display device, a wide-angle image showing a condition beside and behind a vehicle and captured by the image pick-up device may be displayed on the liquid crystal display device, such that blind area of viewing field may be eliminated; on the other hand, with the semi-transmissive and semi-reflective functional layer provided in the liquid crystal display device, the liquid crystal display device of the rearview system may be used as a normal reflector, such that various kinds of needs of different users may be satisfied.

BRIEF DESCRIPTION OF THE DRAWINGS

The above and other features of the present invention will become more apparent by describing in detail exemplary embodiments thereof with reference to the accompanying drawings, in which:

FIG. 4a is a schematic view showing a light path through the liquid crystal display device when a backlight module is turned on;

LIST OF REFERENCE NUMERALS

Figure 1:
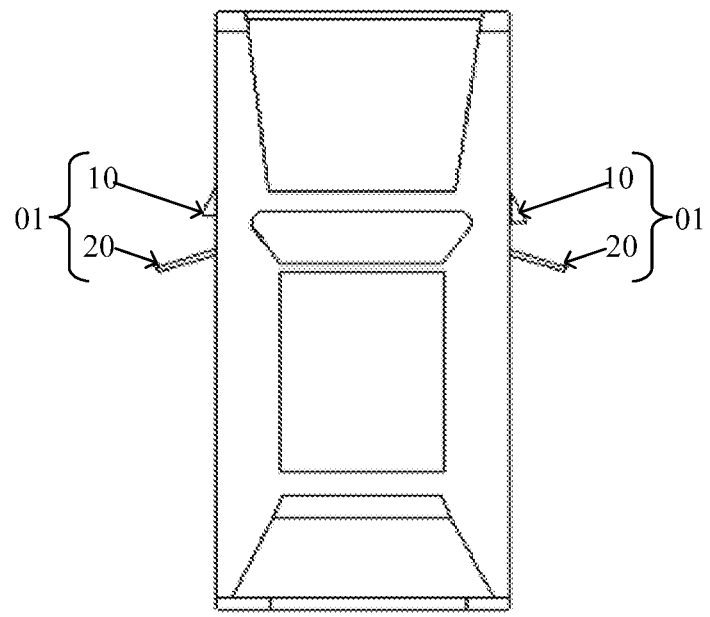
FIG. 1 is a schematic view showing a rearview system for a vehicle according to an embodiment of the invention.

01—rearview system;
10—image pick-up device;

11—infrared lighting unit;
12—image pick-up unit;
20—liquid crystal display device;
21—backlight module;
211—reflective sheet;
212—light source;
213—diffuser;
214—optical film;
22—liquid crystal display panel;
23—semi-transmissive and semi-reflective functional layer;
231—multilayer reflective polarizer;
24—lower polarizer;
25—upper polarizer.

DETAILED DESCRIPTION OF PREFERRED EMBODIMENTS

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

A rearview system 01 is provided in an embodiment of the invention. As shown in FIG. 1, the rearview system includes an image pick-up device 10 and a liquid crystal display device 20; the image pick-up device 10 is configured to acquire an image showing a condition beside and behind a vehicle, and the liquid crystal display device 20 is configured to display the image acquired by the image pick-up device 10 in real time.

Figure 2:
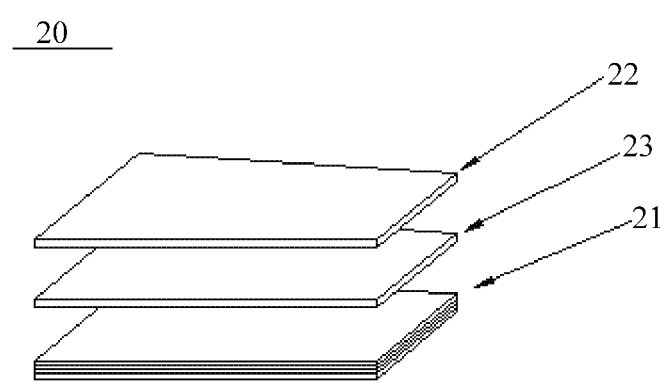
FIG. 2 is a first schematic view showing a structure of a liquid crystal display device according to an embodiment of the invention.

As shown in FIG. 2, the liquid crystal display device 20 includes a backlight module 21, a liquid crystal display panel 22, and a semi-transmissive and semi-reflective functional layer 23 arranged between the backlight module 21 and the liquid crystal display panel 22; the semi-transmissive and semi-reflective functional layer 23 is configured to transmit light emitted by the backlight module 21 when the backlight module 21 is turned on and to reflect external ambient light when the backlight module 21 is turned off.

The liquid crystal display device 20 may be fixed to a housing of a vehicle at a position where a rearview mirror is usually mounted. Since both of the image pick-up device 10 and the liquid crystal display device 20 need electrical power to operate, the image pick-up device 10 and the liquid crystal display device 20 may be connected to a central controller of the vehicle and powered by a power supply device controlled by the central controller.

Since the liquid crystal display device is provided with a functional layer that can switch between a transmissive state and a reflective state, when the image pick-up device 10 and the liquid crystal display device 20 of the rearview system 01 are turned on, the liquid crystal display device 20 of the rearview system 01 may be used as a displayable reflector, and when the image pick-up device 10 and the liquid crystal display device 20 of the rearview system 01 are turned off, the liquid crystal display device 20 of the rearview system 01 may be used as a normal reflector.

The image pick-up device 10 may be, for example, provided with a wide-angle lens, such that it can provide an image covering a relative large viewing angle and thereby eliminate the blind area of viewing field.

Further, with the semi-transmissive and semi-reflective functional layer 23, not only the light emitted by the backlight module 21 may be transmitted, but also utilization coefficient of the light emitted by the backlight module 21 may be improved.

In the rearview system 01 according to the embodiment of the invention, on one hand, with a corporation of the image pick-up device 10 and the liquid crystal display device 20, a wide-angle image showing a condition beside and behind a vehicle and captured by the image pick-up device 10 may be displayed on the liquid crystal display device 20, such that blind area of viewing field may be eliminated; on the other hand, with the semi-transmissive and semi-reflective functional layer 23 provided in the liquid crystal display device 20, the liquid crystal display device 20 of the rearview system 01 may be used as a normal reflector, such that various kinds of needs of different users may be satisfied.

Preferably, the rearview system 01 may further include a switch configured to control the backlight module 21 and/or the image pick-up device 10 to be turned on or turned off.

The switch may, for example, be disposed on a steering wheel or other positions that are convenient for a driver to manipulate, such that the driver may use the liquid crystal display device 20 of the rearview system 01 as a normal reflector or a displayable reflector based on a condition of driving.

Since powering of the image pick-up device 10 and the liquid crystal display device 20 is controlled by the central controller of the vehicle, a corresponding switch may also be connected to the central controller, such that the central controller may determine whether or not to control the power supply device to power the image pick-up device 10 and the liquid crystal display device 20 based on an operation state of the switch set by the driver.

Figure 3:
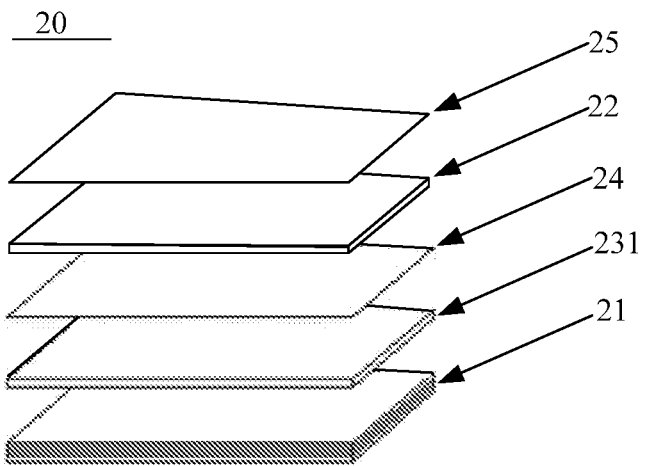
FIG. 3 is a second schematic view showing a structure of a liquid crystal display device according to an embodiment of the invention.

In an alternative embodiment, as shown in FIG. 3, the liquid crystal display device 20 may also include a lower polarizer 24 disposed on a side of the liquid crystal display panel 22 adjacent to the backlight module 21, and an upper polarizer 25 disposed on a side of the liquid crystal display panel 22 facing away from the backlight module 21.

The semi-transmissive and semi-reflective functional layer 23 may include a multilayer reflective polarizer 231, such as an Advanced Polarizer Film (APF). The multilayer reflective polarizer 231 may be arranged between the backlight module 21 and the lower polarizer 24. In an exemplary embodiment, the multilayer reflective polarizer 231 is adhered to the lower polarizer 24, and when the backlight module 21 is turned off, the multilayer reflective polarizer 231 may reflect external ambient light.

Figure 4A:
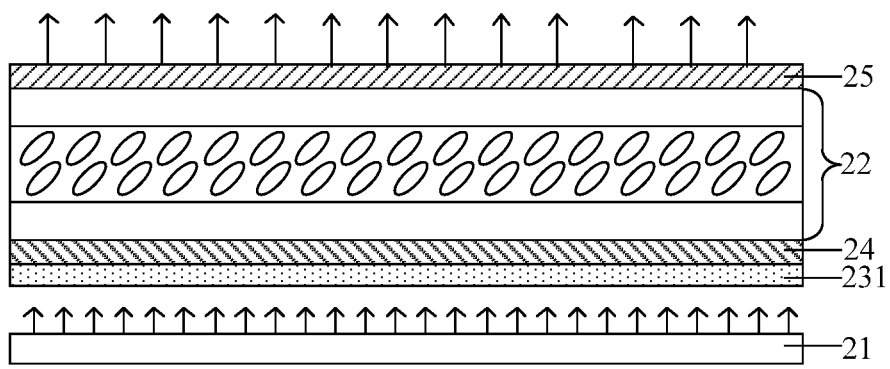
Figure 4B:
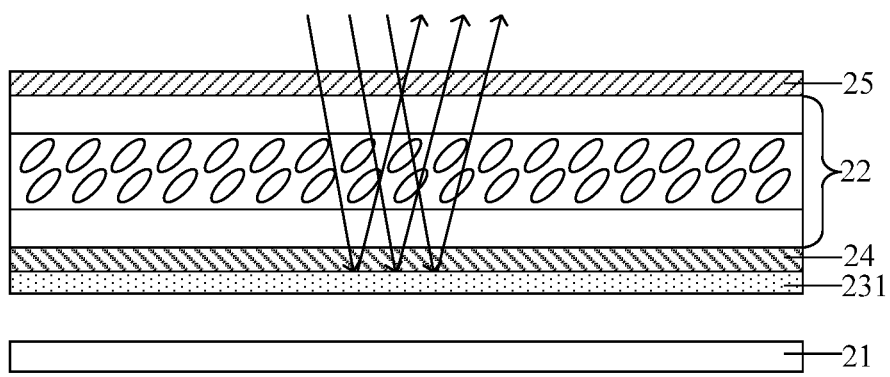
FIG. 4b is a schematic view showing a light path through the liquid crystal display device when the backlight module is turned off.

Specifically, as shown in FIG. 4a, when the backlight module 21 is turned on, light emitted by the backlight module 21 becomes polarized light after passing through the multilayer reflective polarizer 231 and the lower polarizer 24, then it is modulated by liquid crystals in the liquid crystal display panel 22, and exits from the upper polarizer 25. As shown in FIG. 4b, when the backlight module 21 is turned off, the multilayer reflective polarizer 231 adhered to the lower polarizer 24 provides a reflecting function, that is, after passing through the upper polarizer 25, the liquid crystal display panel 22 and the lower polarizer 24, external ambient light arrives at the multilayer reflective polarizer 231, then it is reflected by the multilayer reflective polarizer 231, the reflected light exits after passing through the lower polarizer 24, the liquid crystal display panel 22 and the upper polarizer 25 again.

With the multilayer reflective polarizer 231 according to the embodiment of the invention, light emitted by the backlight module 21 may be transmitted when the backlight module 21 is turned on, external ambient light may be reflected when the backlight module 21 is turned off; moreover, when the backlight module 21 is turned on, a light enhancing effect due to the polarized light being converted may be provided, such that utilization coefficient of light emitted by the backlight module 21 may be improved.

In an exemplary embodiment, the liquid crystal display panel 22 may be a wide-angle liquid crystal display panel.

A wide-angle liquid crystal display panel may be, for example, an Advanced-super Dimensional Switching (ADS) type liquid crystal display panel. That is, both of a pixel electrode and a common electrode may be arranged on an array substrate of the liquid crystal display panel 22, and the pixel electrode and the common electrode are arranged in different layers, the electrode in an upper layer is a strip-shaped electrode, and the electrode in a lower layer is a plate-shaped electrode.

Of course, the wide-angle liquid crystal display panel may also be an In-Plane Switch (IPS) type liquid crystal display panel. That is, both of the pixel electrode and the common electrode may be arranged on the array substrate of the liquid crystal display panel 22, the pixel electrode and the common electrode are arranged in the same layer and spaced apart, and each of the pixel electrode and the common electrode is a strip-shaped electrode.

Further, the wide-angle liquid crystal display panel may also be a Multi-domain Vertical Alignment (MVA) type liquid crystal display panel. That is, liquid crystals in the liquid crystal display panel 22 are oriented into different directions.

With the wide-angle liquid crystal display panel according to the embodiment of the invention, a problem that a driver cannot clearly watch the image displayed by the liquid crystal display panel due to small viewing angle may be eliminated, such that it is ensured that there is no blind area during driving.

In an exemplary embodiment, the backlight module 21 comprises a direct type backlight module. In such a manner, emitted light is uniform and utilization coefficient thereof is relatively high.

Figure 5:
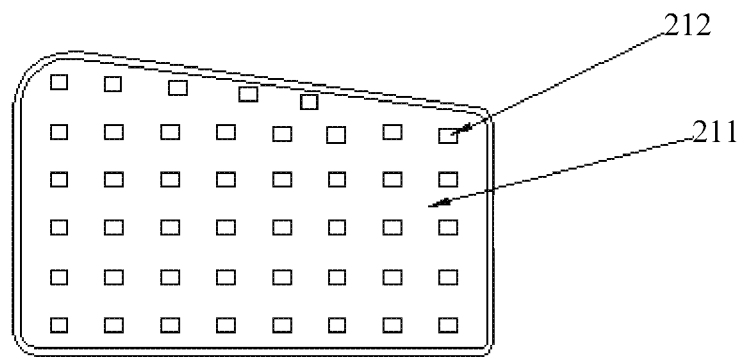
FIG. 5 is a schematic top view showing a direct type backlight module according to an embodiment of the invention.
Figure 6:
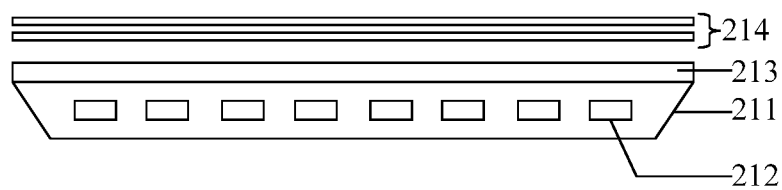
FIG. 6 is a schematic cross-sectional view showing a direct type backlight module according to an embodiment of the invention.

In another exemplary embodiment, as shown in FIGS. 5 and 6, the direct type backlight module includes a reflective sheet 211, a light source 212 disposed uniformly or substantially uniformly on the reflective sheet 211, a diffuser 213, and one or more optical films 214; the light source 212 may be configured to emit light and diffuse the emitted light.

The optical films 214 may, for example, include a diffuser and a prism and the like.

It is to be noted that, the light source 212 may be a light source of any type. In an embodiment that is not shown, the backlight module may further include an additional light diffusing component or layer so as to realize diffusion of light.

In such a manner, light emitted by the light source 212 may be diffused, which may reduce the number of light sources 212 in the direct type backlight module and prevent dark shadow from being occur.

In a further embodiment, the light source 212 may be a light emitting diode (LED) provided with a concave lens.

In one hand, the LED has advantages of high lighting effect, low power consumption, long life and the like, in the other hand, the concave lens may provide a good light diffusion effect.

On the base of the above and considering of a condition of insufficient light intensity when the liquid crystal display device 20 of the rearview system 01 is used as a displayable reflector, especially in daytime, light intensity of light emitted by the backlight module 21 should satisfy a certain criterion to meet a requirement regarding light intensity. Based on the above, the number of the light sources 212 may be determined according to sizes of the reflector and light luminous flux of a single light source 212.

Taking a 11 inch reflector used in an ordinary vehicle for example, regarding a direct type backlight module, 45 LED lights, each of which is provided with a concave lens, may be uniformly arranged on the reflective sheet 211 (as shown in FIG. 5); a diffuser 213, a diffusing sheet, a prism and the like may be disposed above the LED lights successively, where a certain distance between the diffuser 213 and the LED lights is required for light-mixing, which may be, for example, 5 cm.

In an example where light luminous flux of a single light source is 14 lm, a voltage is 2.8 V, and electricity is 40 mA, through stimulation, light intensity of this direct type backlight module may be as high as 16000 nit. In this condition, through optical evaluation, light intensity of the entire liquid crystal display device 20 may be as high as 1400 nit, which may sufficiently satisfy the light intensity requirement for a daytime reflector.

In an exemplary embodiment, the image pick-up device 10 may be a night vision image pick-up device.

With a night vision image pick-up device being used as the image pick-up device 10 according to the embodiment of the invention, the driver may see a non-luminous object beside and behind his vehicle, which may improve driving safety.

Figure 7:
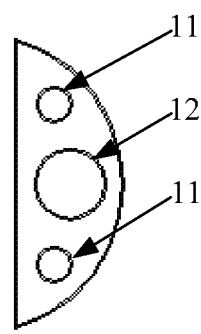
FIG. 7 is a schematic view showing a structure of a night vision image pick-up device according to an embodiment of the invention.

Further, as shown in FIG. 7, the night vision image pick-up device includes an infrared lighting unit 11 and an image pick-up unit 12.

In such a manner, with the infrared lighting unit 11, the image pick-up unit 12 may acquire an image showing a condition beside and behind the vehicle, and the driver may see it after it is display by the liquid crystal display device 20.

In another aspect of the invention, there is also provided a vehicle. In an exemplary embodiment, the vehicle may include the rearview system 01 according to any of the above embodiments.

In the vehicle according to the embodiment of the invention, on one hand, with a corporation of the image pick-up device 10 and the liquid crystal display device 20 of the rearview system 01, a wide-angle image showing a condition beside and behind a vehicle and captured by the image pick-up device 10 may be displayed on the liquid crystal display device 20, such that blind area of viewing field may be eliminated; on the other hand, with the semi-transmissive and semi-reflective functional layer 23 provided in the liquid crystal display device 20, the liquid crystal display device 20 of the rearview system 01 may be used as a normal reflector, such that various kinds of needs of different users may be satisfied.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A rearview system for a vehicle, comprising:
an image pick-up device configured to acquire an image showing a condition beside and behind the vehicle; and
a liquid crystal display device configured to display the image acquired by the image pick-up device in real time,
wherein the liquid crystal display device comprises a backlight module, a liquid crystal display panel which displays the image, and a semi-transmissive and semi-reflective functional layer arranged between the backlight module and the liquid crystal display panel; and
wherein the semi-transmissive and semi-reflective functional layer is configured to transmit light emitted by the backlight module when the backlight module is turned on and to reflect external ambient light when the backlight module is turned off.

2. The rearview system according to claim 1, wherein the rearview system further comprises a switch configured to control at least one of the backlight module and the image pick-up device to be turned on or turned off.

3. The rearview system according to claim 1, wherein the liquid crystal display device further comprises a lower polarizer disposed on a first side of the liquid crystal display panel adjacent to the backlight module and an upper polarizer disposed on a second side of the liquid crystal display panel facing away from the backlight module; and
wherein the semi-transmissive and semi-reflective functional layer comprises a multilayer reflective polarizer arranged between the backlight module and the lower polarizer.

4. The rearview system according to claim 3, wherein the multilayer reflective polarizer is adhered to the lower polarizer.

5. The rearview system according to claim 1, wherein the liquid crystal display panel is a wide-angle liquid crystal display panel.

6. The rearview system according to claim 1, wherein the backlight module is a direct type backlight module.

7. The rearview system according to claim 5, wherein the direct type backlight module comprises a reflective sheet, a light source disposed uniformly on the reflective sheet, a diffuser, and one or more optical films; and
wherein the light source is configured to emit light and diffuse the emitted light.

8. The rearview system according to claim 7, wherein the light source is a LED light provided with a concave lens.

9. The rearview system according to claim 1, wherein the image pick-up device is a night vision image pick-up device.

10. The rearview system according to claim 9, wherein the night vision image pick-up device comprises an infrared lighting unit and an image pick-up unit.

11. A vehicle comprising a rearview system, wherein the rearview system comprises:
an image pick-up device configured to acquire an image showing a condition beside and behind the vehicle; and
a liquid crystal display device configured to display the image acquired by the image pick-up device in real time,
wherein the liquid crystal display device comprises a backlight module, a liquid crystal display panel which displays the image, and a semi-transmissive and semi-reflective functional layer arranged between the backlight module and the liquid crystal display panel; and
wherein the semi-transmissive and semi-reflective functional layer is configured to transmit light emitted by the backlight module when the backlight module is turned on and to reflect external ambient light when the backlight module is turned off.

12. The vehicle according to claim 11, wherein the rearview system further comprises a switch configured to control at least one of the backlight module and the image pick-up device to be turned on or turned off.

13. The vehicle according to claim 11, wherein the liquid crystal display device further comprises a lower polarizer disposed on a first side of the liquid crystal display panel adjacent to the backlight module and an upper polarizer disposed on a second side of the liquid crystal display panel facing away from the backlight module; and
wherein the semi-transmissive and semi-reflective functional layer comprises a multilayer reflective polarizer arranged between the backlight module and the lower polarizer.

14. The vehicle according to claim 13, wherein the multilayer reflective polarizer is adhered to the lower polarizer.

15. The vehicle according to claim 11, wherein the liquid crystal display panel is a wide-angle liquid crystal display panel.

16. The vehicle according to claim 11, wherein the backlight module is a direct type backlight module.

17. The vehicle according to claim 15, wherein the direct type backlight module comprises a reflective sheet, a light source disposed uniformly on the reflective sheet, a diffuser, and one or more optical films; and
wherein the light source is configured to emit light and diffuse the emitted light.

18. The vehicle according to claim 17, wherein the light source is a LED light provided with a concave lens.

19. The vehicle according to claim 11, wherein the image pick-up device is a night vision image pick-up device.

20. The vehicle according to claim 19, wherein the night vision image pick-up device comprises an infrared lighting unit and an image pick-up unit.

* * * * *